(12) United States Patent
Senoo et al.

(10) Patent No.: US 11,194,093 B2
(45) Date of Patent: Dec. 7, 2021

(54) OPTICAL SWITCH ARRAY AND MULTICAST SWITCH

(71) Applicant: NIPPON TELEGRAPH AND TELEPHONE CORPORATION, Tokyo (JP)

(72) Inventors: Kazunori Senoo, Musashino (JP); Keita Yamaguchi, Musashino (JP); Kenya Suzuki, Musashino (JP); Takashi Go, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/968,508

(22) PCT Filed: Mar. 4, 2019

(86) PCT No.: PCT/US2019/008350
§ 371 (c)(1),
(2) Date: Aug. 7, 2020

(87) PCT Pub. No.: WO2019/172176
PCT Pub. Date: Sep. 12, 2019

(65) Prior Publication Data
US 2020/0408990 A1 Dec. 31, 2020

(51) Int. Cl.
*G02B 6/12* (2006.01)
*G02B 6/35* (2006.01)
*G02F 1/313* (2006.01)

(52) U.S. Cl.
CPC ....... *G02B 6/12007* (2013.01); *G02B 6/3546* (2013.01); *G02B 6/3548* (2013.01); *G02F 1/3136* (2013.01); *G02B 2006/1215* (2013.01)

(58) Field of Classification Search
CPC .............. G02B 6/12007; G02B 6/3546; G02B 6/3548; G02B 2006/1215; G02F 1/3136
See application file for complete search history.

(56) References Cited

U.S. PATENT DOCUMENTS 10,545,292 B2 * 1/2020 Takahashi ............... G02F 1/313
2017/0307818 A1 10/2017 Hasegawa

FOREIGN PATENT DOCUMENTS

JP         200638897 A    2/2006
WO     2016/167010 A1   10/2016

OTHER PUBLICATIONS

Toshio Watanabe et al., *Silica-Based PLC Transponder Aggregators for Colorless, Directionless, and Contentionless ROADM*, OFC/NFOEC Technical Digest, OTh3D.1, 2012.

(Continued)

*Primary Examiner* — John Bedtelyon
(74) *Attorney, Agent, or Firm* — Workman Nydegger

(57) ABSTRACT

In an optical switch array on which optical switches that require individual electric wires are integrated, the present invention provides an optical switch array and a multi-cast switch in which the electric wires are shortened by optimizing the arrangement of the optical circuit portion. In the optical switch array in which three arrays of 1×4 switch circuits are disposed in parallel, the position where each optical switch is disposed is sequentially shifted by Dy in the y axis direction. That is, in the case where an adjacent 1×4 optical switch circuit exists on both sides, the 1×4 optical switch located there between is located at the center of the two 1×4 optical switch circuits, which are adjacent in the y axis direction. Each of the three 1×4 optical switch circuits that are arrayed are disposed at a position shifted from the adjacent 1×4 optical switch circuit by Dy in the y axis direction, in accordance with the positional coordinate in the x axis direction, and the electric wires at the ground side are (Continued)

shared such that each optical switch circuit is located sequentially shifted by Dy in the −y axis direction.

12 Claims, 8 Drawing Sheets

(56) References Cited

OTHER PUBLICATIONS

International Search Report and Written Opinion dated May 7, 2019, issued in PCT Application No. PCT/JP2019/008350, filed Mar. 4, 2019.

\* cited by examiner

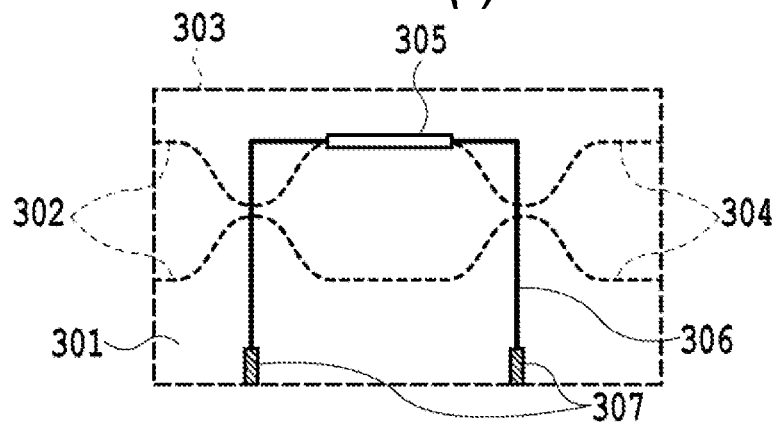
FIG. 3(a)
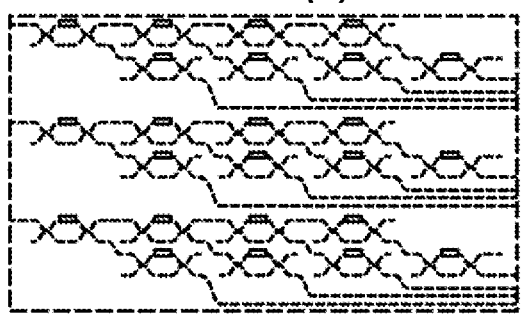
FIG. 3(b)
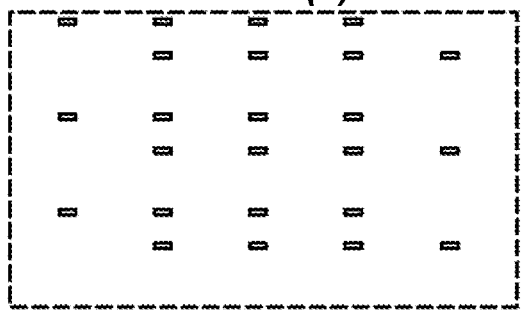
FIG. 3(c)
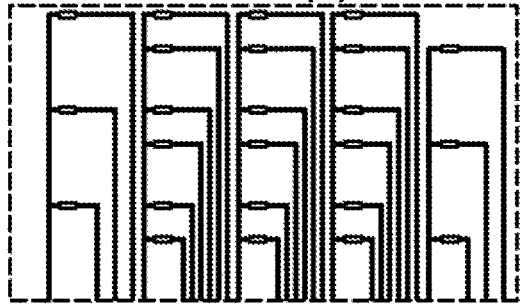
FIG. 3(d)
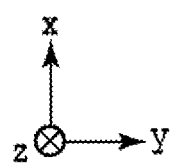

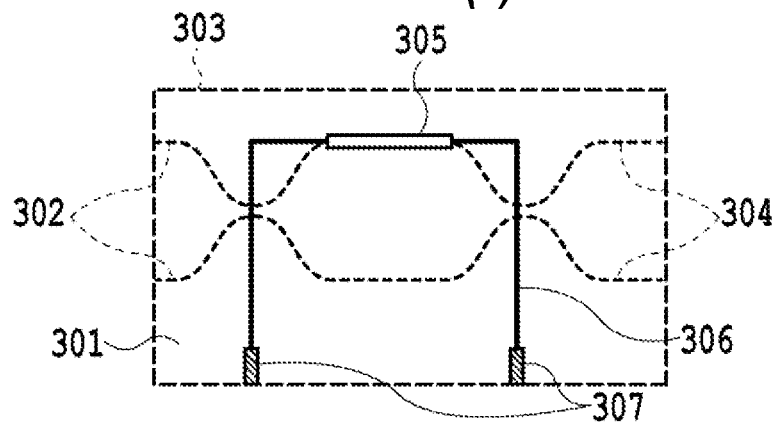
FIG. 6(a)
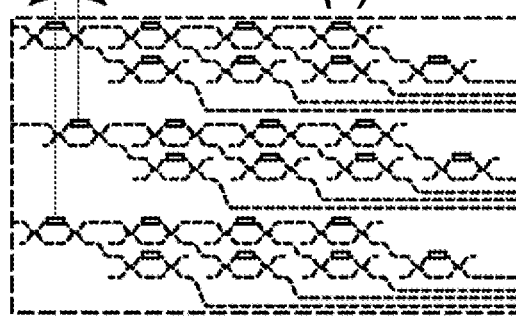
FIG. 6(b)
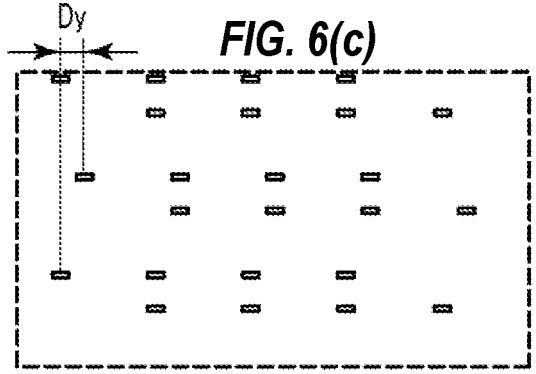
FIG. 6(c)
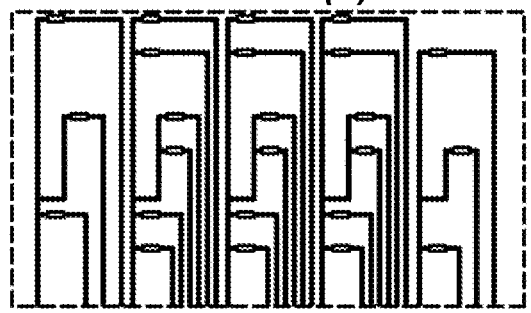
FIG. 6(d)
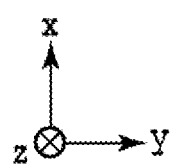

though it is not illustrated. In both cases, a wavelength-multiplexed optical signal inputted to the AWG is separated and outputted from a specific port determined for each wavelength, out of a plurality of output ports. In other words, only a predetermined wavelength of light is outputted from each output port, hence this system configuration is referred to as "Colored".

FIG. 2B indicates a configuration example where a wavelength selective switch (WSS) 202, instead of the AWG 201, is applied to the wavelength demultiplexing function unit group 103. This is a configuration example where the AWG 201 in FIG. 2A is simply replaced with the WSS 202, but the WSS 202 has a function to switch the path of a light having an arbitrary wavelength to an arbitrary output port, hence the receiver group 104 connected at the downstream side of the wavelength demultiplexing function unit group 103 can freely change the wavelength of the light to be received.

OPTICAL SWITCH ARRAY AND MULTICAST SWITCH

TECHNICAL FIELD

The present invention relates to a waveguide type optical switch array and multi-cast switch which are compact and easily manufactured.

BACKGROUND ART

As the need for a larger capacity optical communication network rapidly increases, a transparent network system represented by a reconfigurable optical add/drop multiplexer (ROADM), which directly processes optical signals without electrical switching, has advantages in terms of communication speed, power consumption and signal processing loads at a node, with the importance thereof increasing.

FIG. 1 indicates a configuration example of a conventional ROADM system. A ROADM node in this configuration example includes: an optical amplitude amplification function unit group 101 that amplifies a signal light from a previous stage node for each path; and a wavelength selection function unit group 102 that switches, in wavelength units, such that a signal from each path is connected to a desired subsequent stage node, or an optical signal having a desired wavelength is received by a desired receiver (Drop) via a wavelength demultiplexing function unit group 103 and a receiver group 104 embedded in this node. Further, the ROADM node includes: a wavelength selection function unit group 102 or a wavelength selection function unit group 107 that switches, in wavelength units, such that an optical signal having a desired wavelength is transmitted toward a desired path (Add) via a transmitter group 105 and a wavelength multiplexing function unit group 106; and an optical amplitude amplification function unit group 108 that amplifies the intensity of the optical signal before being transmitted to the subsequent stage node.

In the case of the ROADM system having the configuration illustrated in FIG. 1, the flexibility of the entire system significantly changes depending on the devices constituting the wavelength demultiplexing function unit group 103 and the wavelength multiplexing function unit group 106, and the combination of these devices. FIG. 2A to FIG. 2E indicate configuration examples of the wavelength demultiplexing function unit group 103.

FIG. 2A indicates a configuration example where an arrayed-waveguide grating (AWG) 201, which is most commonly used, is applied to the wavelength demultiplexing function unit group 103. The wavelength-multiplexed optical signal inputted to the AWG is separated and outputted from a specific port determined for each wavelength, out of a plurality of output ports. In other words, only a predetermined wavelength of light is outputted from each output port, hence this system configuration is referred to as "Colored".

FIG. 2B indicates a configuration example where a wavelength selective switch (WSS) 202, instead of the AWG 201, is applied to the wavelength demultiplexing function unit group 103. This is a configuration example where the AWG 201 in FIG. 2A is simply replaced with the WSS 202, but the WSS 202 has a function to switch the path of a light having an arbitrary wavelength to an arbitrary output port, hence the receiver group 104 connected at the downstream side of the wavelength demultiplexing function unit group 103 can freely change the wavelength of the light to be received. Since the relationship between the output port and the wavelength can be freely changed, this system configuration is referred to as "Colorless".

FIG. 2C indicates a configuration example where the configuration in FIG. 2B is upgraded, and in this example, a first WSS 202-1, which receives all the signal from each path, is disposed at the upstream side, a second WSS 202-2, which distributes the output of the first WSS 202-1 to the receiver group 104, is disposed at the downstream side, and the first WSS 202-1 and the second WSS 202-2 are connected in series as the wavelength demultiplexing function unit group 103. In the case of the colorless system in FIG. 2B, the wavelength setting can be freely changed for each output port, but the path connected to the WSS cannot be changed. In the case of the system in FIG. 2C, however, optical signals transmitted from any path can be outputted to any receiver, whereby a "Colorless/Directionless (CD)" system can be implemented.

This system, however, is not yet completely flexible. For example, in a case where optical signals transmitted from a plurality of paths having the same wavelength, wavelength contention occurs between two WSSs. In this case, signals can be transmitted to the receiver group at the downstream side only from one of these paths. In order to implement a "Colorless/Directionless/Contentionless (CDC)" system which is very flexible and can avoid wavelength contention, the configuration of the wavelength demultiplexing function unit group 103 must be further improved.

FIG. 2D is one configuration to implement CDC, where a WSS 202 is disposed for each path, just like FIG. 2B, and a plurality of optical switches 203, each of which is connected with the output port of each WSS one-to-one, are disposed at the downstream side of the WSSs 202.

FIG. 2E is another configuration to implement CDC, where optical splitters 204 are used instead of the WSSs 202 in FIG. 2D. In the case of FIG. 2E, the wavelength filter function played by the WSSs 202 is not used, hence lights with a plurality of different wavelengths are outputted from a same output port. This means that it is necessary to dispose a wavelength filter array before transmitting the lights to the receiver group 104 at the downstream side, or the receiver group 104 itself must have a filter function so that only light having a specific wavelength can be received. Nonetheless it is possible to implement CDC by this type of method.

The optical splitters and the optical switches, which are the composing elements of the configuration in FIG. 2E, have been widely used as waveguide devices and can be integrated on a chip. This chip is called a "multi-cast switch" (MCS). The CDC system can be implemented by either the method in FIG. 2D or the method in FIG. 2E, but each method has a different advantage, that is, the former has good transmission quality since the transmission loss of signal light is low, and the latter can lower installation cost since relatively inexpensive optical components can be used.

CITATION LIST

Non Patent Literature

[NPL 1] T. Watanabe, et. al., "Silica-based PLC Transponder Aggregators for Colorless, Directionless, and Contentionless ROADM," OTh3D.1, OFC 2012, (2012)

SUMMARY OF THE INVENTION

Technical Problem

As described above, many optical switches must be disposed to implement the CDC system, regardless which method is used, hence multi-connection and multi-port features are greatly demanded for optical switches. Generally, the basic platform of an optical switch is a waveguide type optical circuit. Since the confinement of light can be intensified by increasing the refractive index difference of the core and clad, downsizing of the optical circuit is being greatly advanced by such a method as controlling the amount of dopants of the glass used as the core, or by changing the substrate material from a glass type, of which refractive index is low, to a semiconductor type (e.g. silicon, indium phosphorus).

However, regardless how the optical circuit portion is downsized, the redundancy of electric wiring to supply drive energy to perform the switching, required for multi-connection and multi-ports of optical switches, still becomes a factor of dropping the manufacturing yield.

FIG. 3A to FIG. 3D are diagrams for describing this problem. FIG. 3A is a diagram illustrating an optical switch, which is a minimum unit. The optical switch illustrated in FIG. 3A is an example where a simplest optical switch circuit 303 having two inputs and two outputs is formed on one optical waveguide substrate 301. In the optical switch circuit 303, an optical signal inputted from an input waveguide 302 is outputted to either one of the output waveguides 304. The optical switch circuit 303 is normally based on a Mach-Zehnder interferometer (MZI), and performs switching by driving a thin film type heater 305 disposed on one of the branched waveguides, so as to generate the refractive index modulation by the thermo-optical effect, and change the interference conditions. For this, electric wires 306, to supply power to the heater 305, are required, and electrode pads 307 are disposed by wire bonding or the like, to supply electricity from outside the optical waveguide substrate 301.

The configurations illustrated in FIG. 3A to FIG. 3D include a heater disposed on a single arm, which is the simplest optical switch circuit, but a heater may be disposed on both arms of MZI, or an optical circuit other than MZI may be used. The following problem, however, could be generated in the same way, and is not limited to the configuration illustrated in FIG. 3A, if the circuit configuration includes electrodes. In FIG. 3A to FIG. 3D, it is assumed that the circuits are disposed in parallel in the x axis direction, the longer direction of the heater is the y axis, and the z axis is vertical to the optical circuit substrate.

Here a case where an optical switch array is formed by combining a plurality of optical switch circuits 303 will be described. FIG. 3B indicates a conventional optical switch array in which three circuits of 1×4 switches having a high extinction ratio, in which a plurality of MZI-based optical switch circuits 303 (unit elements) illustrated in FIG. 3A are combined. The 1×4 switch illustrated here has a configuration of MZIs connected in a tree shape.

In order to make the extinction ratio high in MZI-based optical switches, a method of allowing light to pass through a plurality of MZIs is normally used. Here it is assumed that light passes through two stages of MZIs to simplify description.

FIG. 3C is a diagram illustrating only a portion corresponding to the heaters 305 in FIG. 3B, omitting the optical circuit elements, and FIG. 3D is a diagram illustrating the electric wiring when both ends of the heater 305 in FIG. 3C are connected to one longer side of the optical waveguide substrate 301.

Generally when an array is formed, each circuit in the array is disposed so that the coordinate positions in the y axis direction match in order to simplify design and implement compactness. Concerning electric wiring, the ground electrodes of the heater existing in the same y coordinate are all integrated in a common electric wire in this description, since the ground of each heater can be common although the voltage to drive each heater is different depending on the switching state.

As illustrated in FIG. 3D, the length of the electric wires to a ground in the y axis direction is very short, but the electric wire to individually set the voltage of each heater must be wired at a different y coordinate respectively, so that these electric wires do not overlap. In other words, unnecessary electric wires must be disposed for this wiring arrangement.

FIG. 4 indicates the wiring to N number of heaters disposed on the same y coordinate. In the case where N number of heaters are arrayed in the x axis direction, the distance to the N-th heater is determined by the arrangement at the optical circuit side (e.g. interval between heaters), and this distance is assumed to be X(N). When the interval between the disposed electric wires in the y axis direction is dy, the length of the wire required for the N-th heater in the y axis direction is Ndy. Based on this, the total length L of the electric wire to individually supply voltage to the heaters is given by the following expression.

Formula 1

$$L = \sum_{n=1}^{N}(X(n) + ndy) = \sum_{n=1}^{N} X(n) N \frac{dy}{2} N(N+1)$$ (Expression 1)

When N increases as the number of arrays of the optical switches increases in Expression (1), the total length L of the electric wires to individually supply voltage dramatically increases. Needless to say, a number of output ports of the optical switches also increases.

Considering the actual manufacturing of circuits, concern here is that the electric resistance of the electric wires may increase to a certain degree when dust or the like adhere to the circuits, and at the worst disconnection may occur. In other words, redundant electric wiring increases the possibility of dust adhesion in accordance with the total length thereof, and becomes a factor of dropping manufacturing yield.

In the case of configuring a large scale optical switch, in particular, the electric wires increase, and yield may dramatically deteriorate. To prevent a drop of yield when circuits are manufactured, it is desirable to minimize the length of the electric wires.

With the foregoing in view, an object of the present invention is that in an optical switch array on which optical switches that require individual electric wires are integrated, an optical switch array and a multi-cast switch of which electric wires are shortened by optimizing the arrangement of the optical circuit portion, are provided.

Means for Solving the Problem

To solve the above problem, an embodiment of the present invention is an optical switch array including a plurality of optical switch circuits which change the traveling direction of an optical signal by applying voltage to each optical modulation unit via electric wires. The electric wires are capable of applying voltage to each optical modulation unit independently, and are connected to both ends of the optical modulation unit in the longer direction. The plurality of optical switch circuits are disposed in parallel with a direction vertical to the longer direction of the optical modulation unit, and the optical switch circuits are disposed so that the longer-direction positions of both ends of the optical modulation unit included in each optical switch circuit do not match in the longer direction, with the longer direction-positions of both ends of the optical modulation unit included in the adjacent optical switch.

In another embodiment, when the optical switch circuit has two adjacent optical switch circuits, the optical switch circuit is located between the two adjacent optical switch circuits in the longer direction.

In another embodiment, when the optical switch circuit has two adjacent optical switch circuits, the optical switch circuit is located so that the two adjacent optical switch circuits on the same side in the longer direction.

Another embodiment of the present invention is an optical switch array including a plurality of optical switch circuits which change the traveling direction of an optical signal by applying voltage to each optical modulation unit via electric wires. The electric wires are capable of applying voltage to each optical modulation unit independently, and are connected to both ends of the optical modulation unit in the longer direction. The plurality of optical switch circuits are disposed in parallel with a direction vertical to the longer direction of the optical modulation unit, and the optical switch circuits are disposed so that the longer-direction positions of both ends of the adjacent optical modulation unit, among the optical modulation units which overlap in the direction vertical to the longer direction, do not match in the longer direction.

In another embodiment, when the optical modulation unit has two adjacent optical modulation units, both ends of the optical modulation unit in the longer direction are located between the two adjacent optical modulation units in the longer direction.

In another embodiment, when the optical modulation unit has two adjacent optical modulation units, both ends of the optical modulation unit in the longer direction are located so that the two adjacent optical modulation units are on the same side in the longer direction.

In another embodiment, the electric wire which is connected to one end of the optical modulation unit is a common electric wire to apply common voltage to all the optical modulation units, and is wider than the width of the electric wire connected to the other end of the optical modulation unit.

In another embodiment, an optical splitter that is connected to the plurality of optical switch circuits and branches the optical signal is further included, and the plurality of optical switch circuits and the optical splitter are formed on a same substrate.

Effects of the Invention

In an optical switch array on which optical switches that require individual electric wires are integrated, the present invention allows to shorten the electric wires by optimizing the arrangement of the optical circuit portion, whereby the drop of yield when circuits are manufactured can be prevented.

BRIEF DESCRIPTION OF DRAWINGS

FIG. 3A is a diagram depicting an optical switch in the minimum unit, FIG. 3B is a diagram depicting a conventional optical switch array where a 1×4 switch having a high extinction ratio, in which a plurality MZI-based optical switch circuits (unit elements) illustrated in FIG. 3A are combined, is arrayed for three circuits, FIG. 3C is a diagram depicting only portions corresponding to the heaters in FIG. 3B, omitting the optical circuit elements, and FIG. 3D is a diagram depicting electric wires on FIG. 3C when both ends of each heater are connected to one longer side of the optical waveguide substrate.

FIG. 6A is a diagram depicting an optical switch in the minimum unit, FIG. 6B is a diagram depicting a configuration example of an optical switch array according to Embodiment 2 of the present invention, where a 1×4 switch having a high extinction ratio, in which a plurality of MZI-based optical switch circuits (unit elements) illustrated in FIG. 6A are combined, is arrayed for three circuits, FIG. 6C is a diagram depicting only portions corresponding to the heaters in FIG. 6B, omitting the optical circuit elements, and FIG. 6D is a diagram depicting electric wires on FIG. 6C when both ends of each heater are connected to one longer side of the optical waveguide substrate.

DESCRIPTION OF EMBODIMENTS

Figure 1:
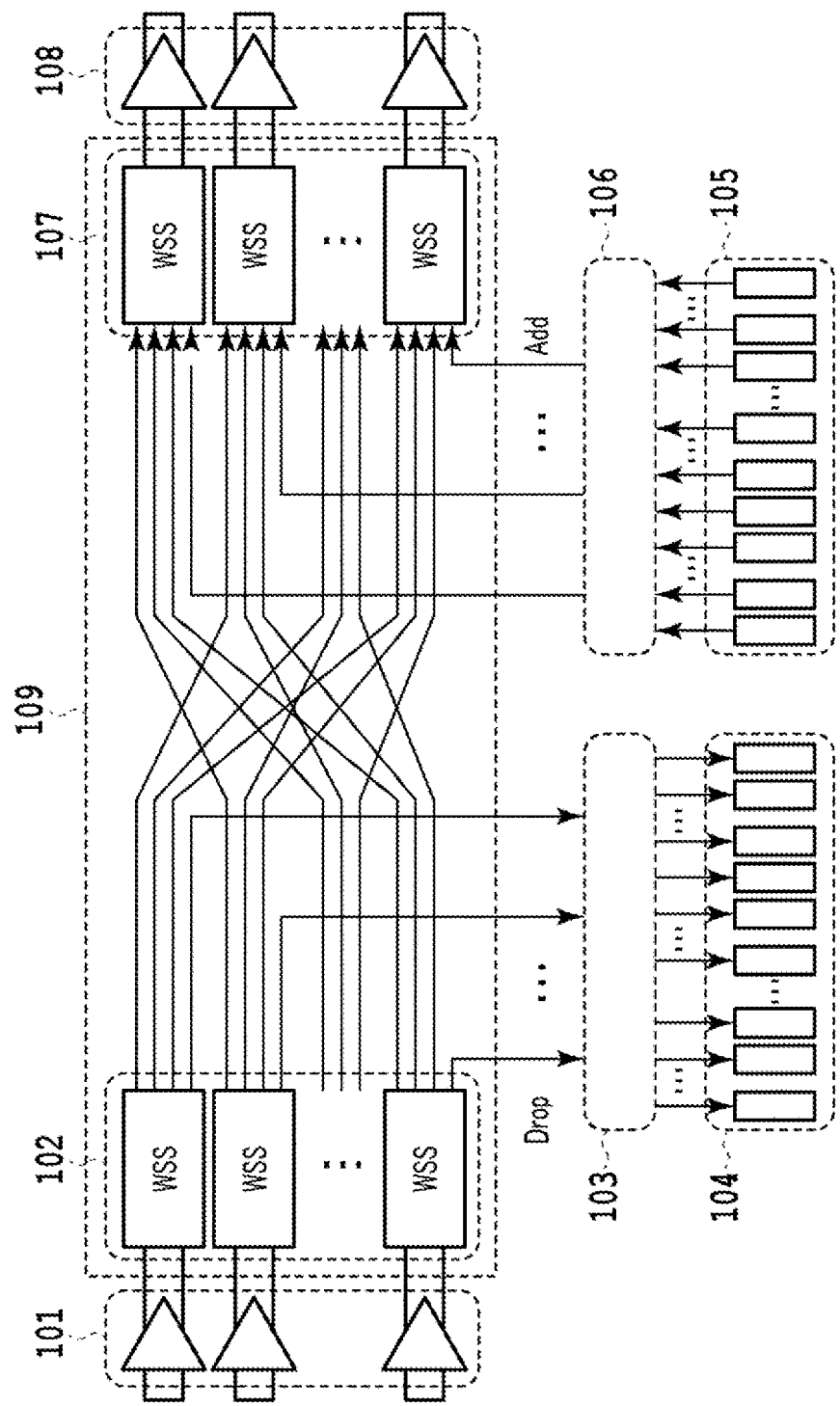
FIG. 1 is a diagram depicting a configuration example of a conventional ROADM system.
Figure 2A:
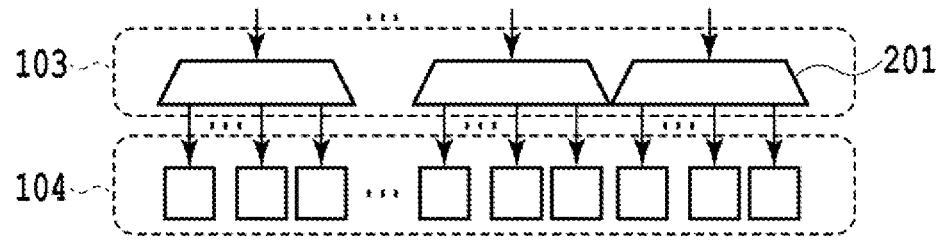
FIG. 2A is a diagram depicting a configuration example where an arrayed-wavelength grating (AWG), which is most commonly used, is applied to a wavelength demultiplexing function unit group.
Figure 2B:
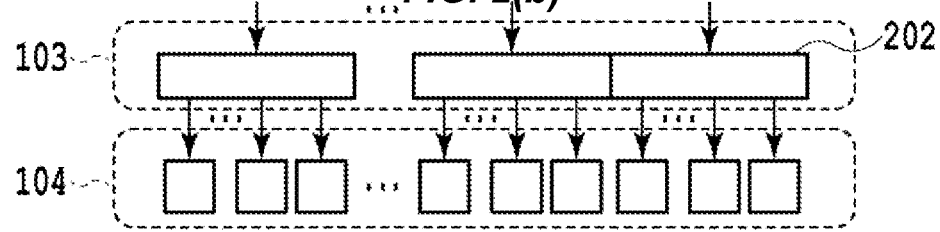
FIG. 2B is a diagram depicting a configuration example where a wavelength selective switch (WSS), instead of AWG, is applied to the wavelength demultiplexing function unit group.
Figure 2C:
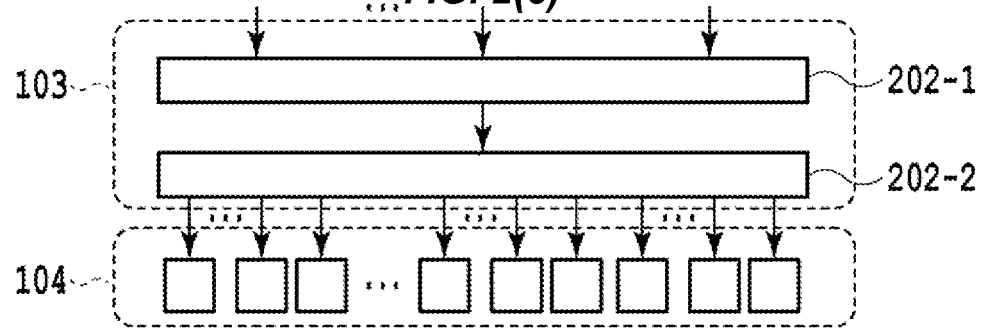
FIG. 2C is a diagram depicting a configuration example where a first WSS is disposed at the upstream side, a second WSS, which distributes the output of the first WSS toward a receiver group, is disposed at the downstream side, and the first WSS and the second WSS are connected in series and applied to the wavelength demultiplexing function unit group.
Figure 2D:
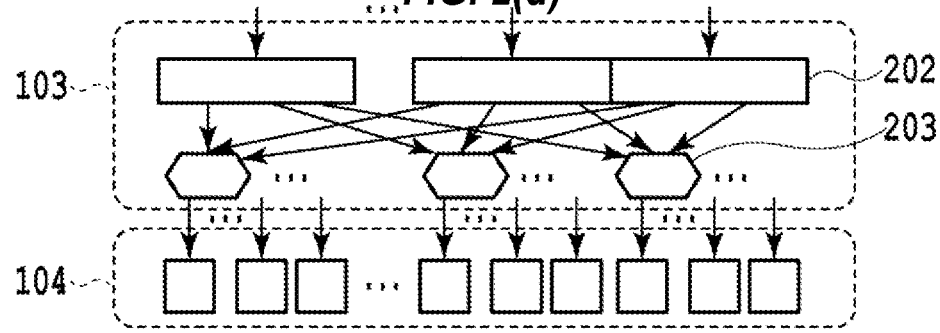
FIG. 2D is a diagram depicting a configuration example where WSS is disposed for each path, and a plurality of optical switches which are connected with the output port of each WSS one-to-one respectively are disposed at the downstream side.
Figure 2E:
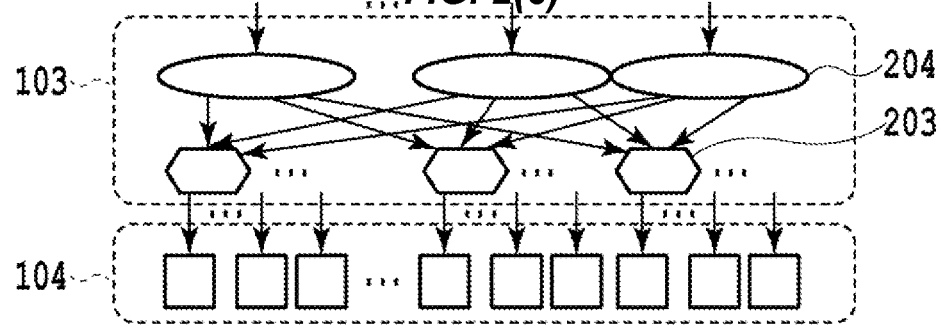
FIG. 2E is a configuration example where the optical splitters are used in FIG. 2D instead of WSSs.
Figure 4:
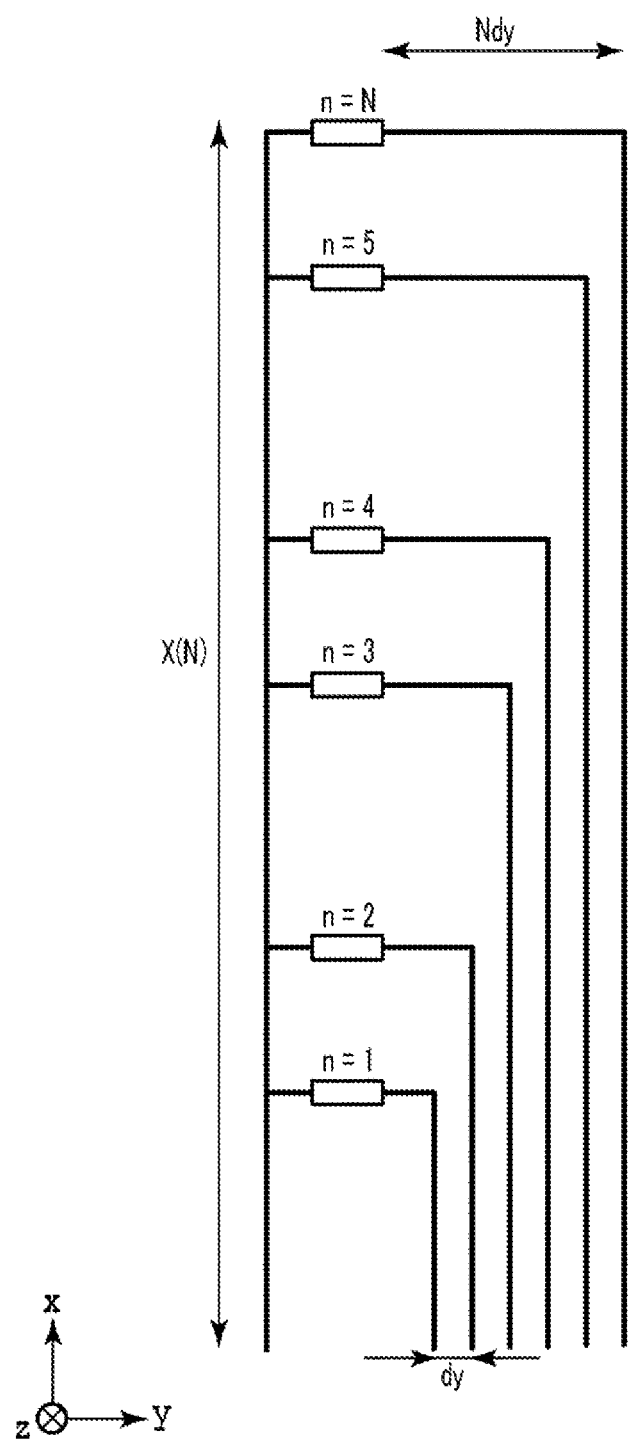
FIG. 4 is a diagram depicting the wires to the N number of heaters disposed on the same y coordinate.

Embodiments of the present invention will be described. The present invention, however, is not limited to the embodiments. A same reference sign in the drawings indicates a same or equivalent portion.

Here a 1×4 switch is configured using a tree type MZI configuration, and the 1×4 switch is arrayed for three circuits, but the scale of the optical switch and the scale of the array are not limited to this example.

Embodiment 1

FIG. 5A to FIG. 5D are diagrams depicting a configuration of an optical signal processing apparatus according to Embodiment 1 of the present invention. An optical switch array of the present invention is an array of optical switches having the same optical circuit configuration, where the y coordinate position of each optical switch is sequentially shifted by Dy, so as to simplify and shorten the electric wires. In FIG. 5A to FIG. 5D, it is assumed that the circuits are disposed in parallel in the x axis direction, the longer direction of the heater is the y axis, and the z axis is vertical to the optical circuit substrate.

Figure 5A:
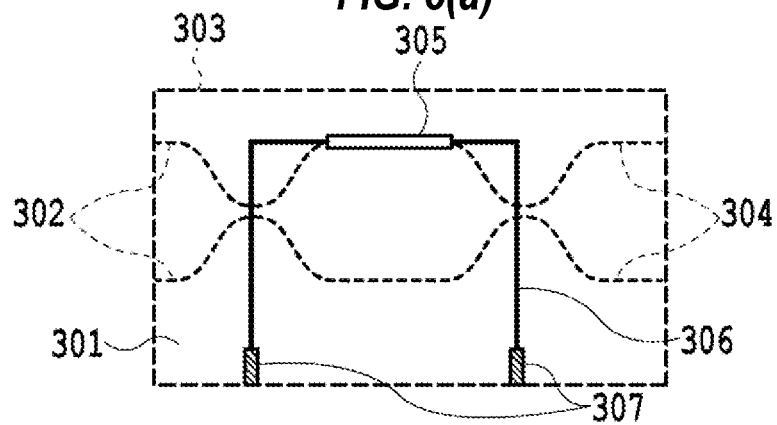
FIG. 5A is a diagram depicting an optical switch in the minimum unit.
Figure 5B:
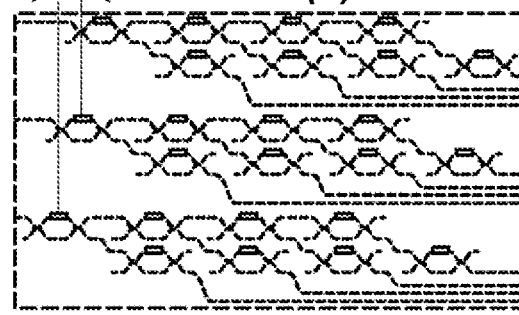
FIG. 5B is a diagram depicting a configuration example of an optical switch array according to Embodiment 1 of the present invention, where a 1×4 switch having a high extinction ratio, in which a plurality of MZI-based optical switch circuits (unit elements) illustrated in FIG. 5A are combined, is arrayed for three circuits.

FIG. 5A is a diagram depicting an optical switch, which is the minimum unit, and FIG. 5B is a diagram depicting a configuration example of an optical switch array according to Embodiment 1 of the present invention, where a 1×4 switch circuit in which a plurality of MZI-based optical switches (unit elements) illustrated in FIG. 5A are combined, is disposed for three arrays in parallel. As mentioned above, each 1×4 optical switch has an identical configuration, but the position where each optical switch is disposed is sequentially shifted by Dy in the y axis direction. In other words, in the case where an adjacent 1×4 optical switch circuit exists on both sides, the 1×4 optical switch circuit disposed there between is located at the center between the two adjacent 1×4 optical switch circuits in the y axis direction.

Figure 5C:
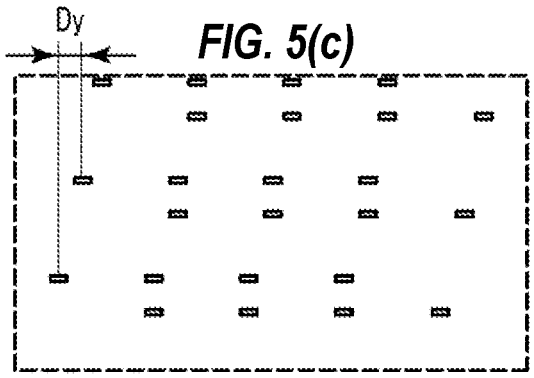
FIG. 5C is a diagram depicting only portions corresponding to the heaters in FIG. 5B, omitting the optical circuit elements.
Figure 5D:
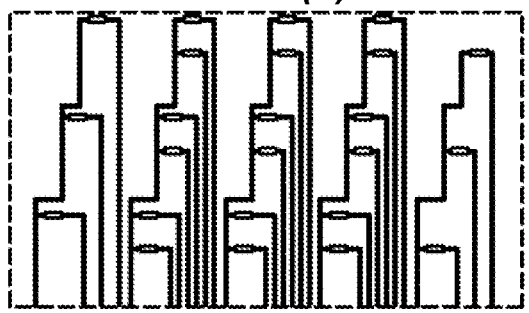
FIG. 5D is a diagram depicting electric wires on FIG. 5C when both ends of each heater are connected to one longer side of the optical waveguide substrate.

FIG. 5C is a diagram depicting only portions corresponding to the heaters 305 in FIG. 5B, omitting the optical circuit elements. FIG. 5D is a diagram depicting a configuration on FIG. 5C when the electric wires are connected from each heater 305 to one longer side of the optical switch array.

In the wiring example in FIG. 5D, the three arrayed 1×4 optical switch circuits are disposed such that the positions of the adjacent 1×4 optical switch circuits are sequentially shifted by Dy in the y axis direction in accordance with the position coordinate in the x axis direction, and the electric wires on the ground side of the 1×4 optical switch circuits are shared while the electric wire position of each optical switch circuit is sequentially shifted by Dy in the −y axis direction. In this way, a characteristic of the present invention is that the optical switch circuits located in parallel are disposed so as to be sequentially shifted in the longer direction of the heater, whereby the length of the electric wires that can be shared is increased for the amount required for shifting the positions of the heaters shifted in the longer direction of the heater, and the length of the electric wires that cannot be shared is decreased in the longer direction of the heater.

In this configuration, the total length L of the electric wires that provides voltage to the optical switch circuits individually can be given by the following Expression (2), where A is a number of arrays of the optical switch circuits, and H is a number of heaters which are disposed in parallel in the x axis direction in one optical switch circuit.

Formula 2

$$L = \sum_{n=1}^{N}(X(n) + ndy) - \sum_{a=1}^{A}(aH \cdot Dy) = \sum_{n=1}^{N} X(n) + \frac{dy}{2}N(N+1) - \frac{HDy}{2}A(A+1)$$
(Expression 2)

In Expression (2), as the number of arrays A and the number of heaters H of the optical switch circuits increase and the scale of the optical switch arrays becomes larger, the effect of shortening the electric wires become more conspicuous. Thereby the reliability and yield of the chip as a whole dramatically improve.

In forming an array of the optical switch circuits illustrated in FIG. 5B to FIG. 5D, one 1×4 optical switch circuit is designed first, then the position of each 1×4 optical switch circuit is sequentially shifted by Dy in the y axis direction. This method has an advantage in terms of simplicity in optical design, whereby the time for performing similar designing and fine adjustment of the design can be dramatically reduced.

Another possible design to further shorten the electric wires is to match the y coordinate positions of the optical switch circuits before being sequentially shifted, and to shift all the heaters which are disposed in parallel in the x axis direction from an adjacent heater by Dy in the y axis direction. In this case, the total length L of the electric wires that supply voltage to the optical switch circuits individually can be given by the following Expression (3).

Formula 3

$$L = \sum_{n=1}^{N}(X(n) + ndy - nHDy) = \sum_{n=1}^{N} X(n) + \frac{dy}{2}N(N+1) - \frac{HDy}{2}N(N+1)$$
(Expression 3)

Since a number of heaters disposed in parallel is normally twice or more than a number of switches of the optical switch circuits, this design can expect further shortening of the electric wires.

Embodiment 2

FIG. 6A to FIG. 6D are diagrams depicting a configuration of an optical switch array according to Embodiment 2 of the present invention. In the design method of Embodiment 1, all optical switch circuits are sequentially shifted by Dy in the y axis direction, but in the optical switch of Embodiment 2 of the present invention, the electric wires are shortened by disposing the optical switch circuits such that the y coordinate position of each even numbered optical switch circuit is sequentially shifted by Dy. In FIG. 6A to FIG. 6D, it is assumed that the circuits are disposed in parallel in the x axis direction, the longer direction of the heater is the y axis, and the z axis is vertical to the optical circuit substrate.

FIG. 6A is a diagram depicting an optical switch which is the minimum unit, and FIG. 6B is a diagram depicting a configuration example of an optical switch array according to Embodiment 2 of the present invention, where a 1×4 switch circuit, in which a plurality of MZI-based optical switches (unit elements) illustrated in FIG. 6A are combined, is disposed for three arrays in parallel. As mentioned above, each 1×4 optical switch circuit has an identical configuration, but only the position of the 1×4 optical switch circuit disposed at the center of the three 1×4 optical switch circuits is sequentially shifted by Dy in the y axis direction. Therefore, in the case where an adjacent 1×4 optical switch circuit exists on both sides, the 1×4 optical switch circuit disposed there between has the two adjacent 1×4 optical switch circuits which are located on the same side in the y axis direction.

FIG. 6C is a diagram depicting only portions corresponding to the heaters 305 in FIG. 6B, omitting the optical circuit elements. FIG. 6D is a diagram depicting a configuration on FIG. 6C when electric wires are connected from each heater 305 to one longer side of the optical switch array.

In Embodiment 1, the length of the electric wires is shortened, but a problem is that the length of the optical waveguide substrate 301 in the y axis direction increases. To solve this problem, in the wiring example of FIG. 6D, an increase in the overall length of the optical waveguide substrate 301 in the y axis direction is suppressed by shifting, in the y direction, only the optical circuits located in an even numbered position in the x axis direction, out of the arrayed optical switch circuits.

In this configuration, the total length L of the electric wires that provide voltage to the optical switch circuits individually can be given by the following Expression (4), where B is a number of arrays of the even numbered optical switch circuits of which positions are shifted, and H is a number of heaters which are disposed in parallel in the x axis direction in one optical switch circuit.

Formula 4

$$L = \sum_{n=1}^{N} (X(n) + ndy) - BH \cdot Dy = \sum_{n=1}^{N} X(n) + \frac{dy}{2} N(N+1) - BH \cdot Dy$$

(Expression 4)

Compared with Embodiment 1, the effect of shortening the length of the electric wires is less since a number of optical switch arrays to be shifted is limited, but still the effect of shortening the length of the electric wires can be implemented without changing the length of the optical waveguide substrate 301 in the y axis direction very much.

The 1×4 optical switches to be shifted in the y axis direction are not limited to the even numbered optical switch circuits, but may be the odd numbered optical switch circuits, or the optical switch circuits that are shifted in the y axis direction and the optical switch circuits that are not shifted may be disposed irregularly. Further in Embodiment 2, just like Embodiment 1, all the heaters which have the same y coordinate positions before shifting and which are disposed in parallel in the x axis direction, may be shifted in the y axis direction from the adjacent heater by Dy, so that adjacent heaters are disposed in a staggered pattern, instead of shifting each 1×4 optical switch circuit in the y axis direction.

Embodiment 3

Figure 7A:
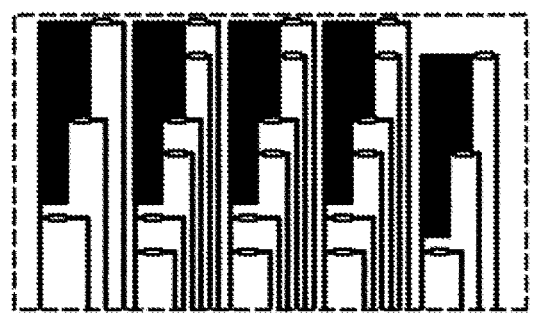
FIG. 7 is a diagram depicting a configuration of an optical switch array according to Embodiment 3.
Figure 7B:
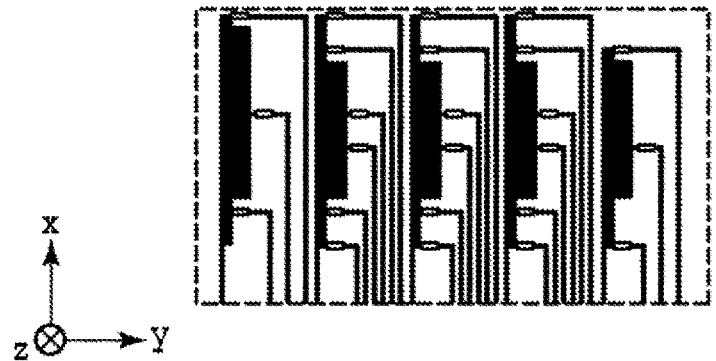

FIG. 7 and FIG. 7B are diagrams depicting a configuration of an optical switch array according to Embodiment 3 of the present invention. In Embodiments 1 and 2, an aspect of the invention in which reliability and yield are improved by shortening the electric wires to control voltage individually, was described, but in Embodiment 3, reliability is improved by expanding the area of the ground electrode, in addition to the effects of Embodiments 1 and 2. In FIG. 7A and FIG. 7B, it is assumed that the circuits are disposed in parallel in the x direction, the longer direction of the heater is the y axis, and the z axis is vertical to the optical circuit substrate.

FIG. 7A is a diagram depicting an example where the expanded ground electrode of Embodiment 3 is applied to the electric wiring method described in Embodiment 1. FIG. 7B is a diagram depicting an example where the expanded ground electrode of Embodiment 3, and is applied to the electric wiring method described in Embodiment 2.

In Embodiments 1 and 2, if the optical switch circuits are shifted in the y axis direction, a wide space is created in a region where the ground electrode is disposed, hence it is designed so that this space becomes a ground electrode which is as wide as possible in the y axis direction. Normally electric wires formed on the optical waveguide substrate are not formed by drawing each wire, but by forming a film of an electric wire material on the entire surface of the optical waveguide substrate by sputtering and the like, and then removing the film leaving only necessary portions by masking. Therefore, according to Embodiment 3, the width of the ground electrode can be increased without requiring any additional manufacturing steps compared to Embodiments 1 and 2.

Most causes of failures and deterioration of electric wires involves dust, of which scale is similar to the width of the electric wires, that attaches to and damages the wires. If the ground electrode is formed as widely as possible in the open space, even when micro dust adheres to a part of an electric wire, electricity can still flow via the rest of the region where dust does not adhere. As a consequence, the failure rate at the ground side can be further decreased.

Embodiment 4

Figure 8A:
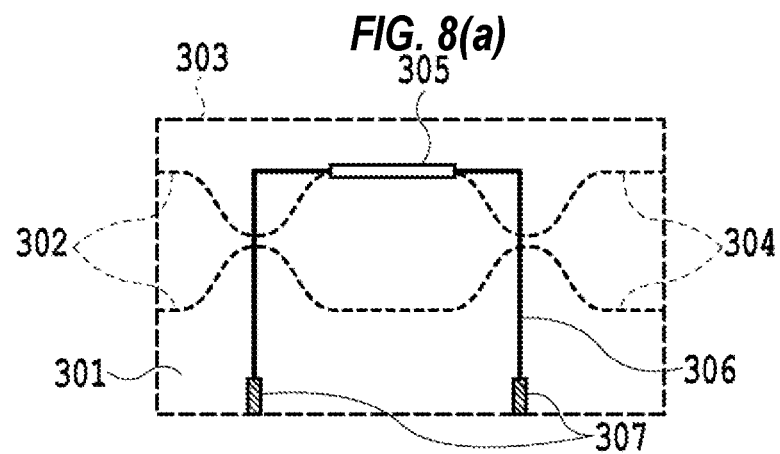
FIG. 8A is a diagram depicting an optical switch in the minimum unit.
Figure 8B:
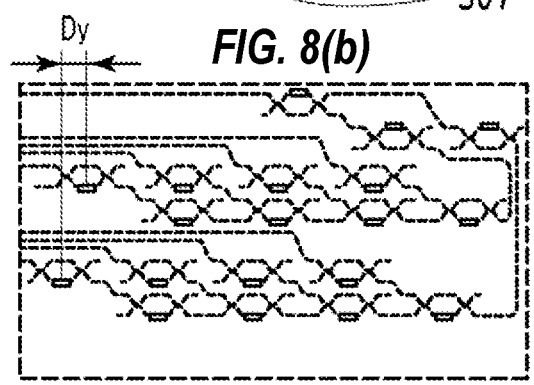
FIG. 8B is a diagram depicting a configuration example of an optical switch array according to Embodiment 4 of the present invention, comprised of a 1×2 switch circuit in which a plurality of MZI-based optical switches (unit elements) illustrated in FIG. 8A are combined; and a 1×8 optical switch circuit where two arrays of 1×4 optical switch circuits are disposed in parallel with the 1×2 switch circuit.

FIG. 8A to FIG. 8D are diagrams depicting a configuration of an optical switch array according to Embodiment 4 of the present invention. In Embodiments 1 to 3, the circuit configuration is the arrayed three 1×4 optical switch circuits, but in Embodiment 4, a configuration example of a 1×8 optical switch circuit, where a 1×2 optical switch circuit is additionally connected to the previous stage of the arrayed two 1×4 optical switch circuits, will be described. The 1×2 optical switch circuit is connected with the arrayed two 1×4 optical circuits in parallel via a fold back optical waveguide. The two 1×4 optical switch circuits are disposed such that the configuration, excluding the electrodes, is vertically and horizontally inverted compared with the corresponding circuit portion in FIG. 5B of Embodiment 1. A number of electrodes of Embodiment 4 is decreased since one of the 1×4 optical switch circuits is replaced with the 1×2 optical switch circuit, but except for this difference, the arrangement of the electrodes is the same as the arrangement of the electrodes in FIG. 5. In FIG. 8A and FIG. 8B, it is assumed that the circuits are disposed in parallel in the x axis direction, the longer direction of the heater is the y axis, and the z axis is vertical to the optical circuit substrate.

FIG. 8A is a diagram depicting an optical switch, which is the minimum unit, and FIG. 8B is a diagram depicting a configuration example of an optical switch array according to Embodiment 4 of the present invention, where the 1×8 optical switch circuit is formed by: the 1×2 optical switch circuit, in which a plurality of MZI-based optical switches (unit elements) illustrated in FIG. 8A are combined; and the 1×4 optical switch circuit disposed for two arrays in parallel with the 1×2 optical switch circuit. Each of the two 1×4 optical switch circuits has an identical configuration, but the position where each optical switch circuit is disposed is shifted by Dy in the y axis direction. In the 1×2 switch circuit as well, the position where each optical switch (unit element) is disposed is sequentially shifted by Dy in the y axis direction.

Figure 8C:
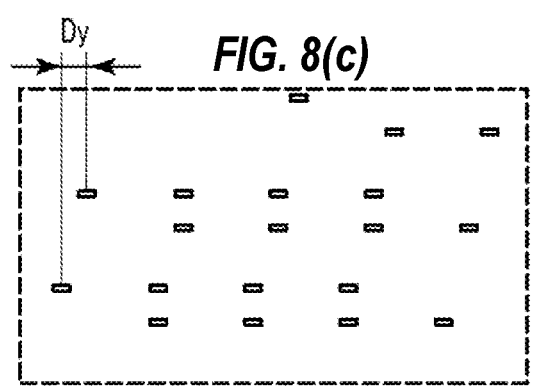
FIG. 8C is a diagram depicting only portions corresponding to the heaters in FIG. 8B, omitting the optical circuit elements.
Figure 8D:
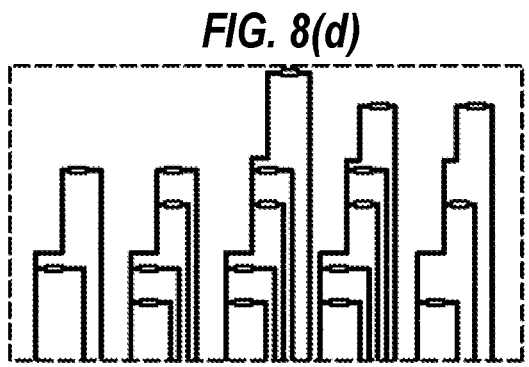
FIG. 8D is a diagram depicting electric wires on FIG. 8C when both ends of each heater are connected to one longer side of the optical waveguide substrate.

FIG. 8C is a diagram depicting only portions corresponding to the heaters 305 in FIG. 8B, omitting the optical circuit elements. FIG. 8D is a diagram depicting a configuration on FIG. 8C where the electric wires are connected from each heater 305 to one longer side of the optical switch array.

In Embodiment 4, the 1×8 optical switch circuit is described as an example, but in the case of the MZI-based optical switches, the length in the y axis direction increases as the number of branches increases, since a number of optical switches that are connected in series increases. Therefore, in order to downsize the optical switch, the optical circuits are normally folded back and disposed in this state. In FIG. 8B, the light that is inputted from the upper left portion is propagated in the x axis direction and is connected to the 1×2 optical switch circuit. The 1×2 optical switch is connected via the fold back circuit to the two arrays of 1×4 optical switch circuits, which are disposed such that the light propagates in the −y axis direction, whereby the 1×8 optical switch circuit is implemented.

As mentioned above, the positions of the electrodes in FIG. 8D are the same as the corresponding electrodes in FIG. 5 of Embodiment 1, hence even if it is a single optical switch circuit, the electrodes and electrode wires can be disposed in the same manner as Embodiment 1, and the length of the wires can still be shortened. The fold back configuration of the present invention is not limited to the combination of the optical switch circuits illustrated in FIG. 8B to FIG. 8D, but multi-input multi-output matrix switches may be connected via the fold back circuit.

By combining the optical switch arrays according any one of Embodiments 1 to 4 and optical splitters which branch the optical signals, a multi-cast switch, of which electric wires are shortened, can be configured, and the multi-cast switch can be more easily manufacturing since the optical switch arrays and the optical splitters can be formed on the same optical waveguide substrate.

REFERENCE SIGNS LIST

101 Optical amplitude amplification function unit group
102 Wavelength selection function unit group
103 Wavelength demultiplexing function unit group
104 Receiver group
105 Transmitter group
106 Wavelength multiplexing function unit group
107 Wavelength selection function unit group
108 Optical amplitude amplification function unit group
201 AWG
202 WSS
203 Optical switch
204 Optical splitter
301 Optical waveguide substrate
302 Input waveguide
303 Optical switch circuit
304 Output waveguide
305 Heater
306 Electric wire
307 Electrode pad

The invention claimed is:

1. An optical switch array comprising:
a plurality of optical switch circuits which change a traveling direction of an optical signal by applying voltage to a plurality of optical modulation units via a plurality of electric wires, each optical switch circuit comprising an optical modulation unit of the plurality of optical modulation units,
wherein the plurality of electric wires are capable of applying voltage to each optical modulation unit independently, and both ends of each optical modulation unit in a longer direction are connected to the plurality of electric wires,
wherein the plurality of optical switch circuits are disposed in parallel with a direction vertical to the longer direction of the optical modulation unit, and
wherein the plurality of optical switch circuits are disposed so that the longer-direction positions of both ends of the optical modulation unit included in each optical switch circuit do not match in the longer direction with the longer direction-positions of both ends of the optical modulation unit included in an adjacent optical switch circuit.

2. The optical switch array according to claim 1, wherein when a first optical switch circuit of the plurality of optical circuits has two adjacent optical switch circuits, the first optical switch circuit is located between the two adjacent optical switch circuits in the longer direction.

3. The optical switch array according to claim 1, wherein when a first optical switch circuit of the plurality of optical circuits has two adjacent optical switch circuits, the first optical switch circuit is located so that the two adjacent optical switch circuits are on the same side in the longer direction.

4. The optical switch array according to claim 1, wherein a first electric wire of the electric wires which is connected to one end of the optical modulation unit is a common electric wire to apply common voltage to all the optical modulation units, and is wider than the width of second electric wire of the electric wires connected to the other end of the optical modulation unit.

5. A multi-cast switch comprising:
the optical switch array according claim 1; and
an optical splitter that is connected to the optical switch array and splits the optical signal, wherein the optical switch array and the optical branches are formed on a same substrate.

6. The optical switch array of claim 1, wherein each optical modulation unit comprises a heater.

7. The optical switch array of claim 1, wherein a number of the plurality of optical modulation units is greater than two times a number of the plurality of optical switches.

8. An optical switch array comprising:
a plurality of optical switch circuits which change a traveling direction of an optical signal by applying voltage to a plurality of optical modulation units via a plurality of electric wires, each optical switch comprising an optical modulation unit of the plurality of optical modulation units,
wherein the plurality of electric wires are capable of applying voltage to each optical modulation unit independently, and both ends of each optical modulation unit in a longer direction are connected to the plurality of electric wires, wherein the plurality of optical switch circuits are disposed in parallel in a direction vertical to the longer direction of the optical modulation unit, and wherein the plurality of optical switch circuits are disposed so that the longer-direction positions of both ends of adjacent optical modulation units, among the plurality of optical modulation units which overlap in the direction vertical to the longer direction, do not match in the longer direction when viewed in the direction vertical to the longer direction.

9. The optical switch array according to claim 8, wherein when a first optical modulation unit of the plurality of modulation units has two adjacent optical modulation units, both ends of the first optical modulation unit in the longer direction are located between the two adjacent optical modulation units in the longer direction.

10. The optical switch array according to claim 8, wherein when a first optical modulation unit of the plurality of modulation units has two adjacent optical modulation units, both ends of the first optical modulation unit in the longer direction are located so that the two adjacent optical modulation units are on the same side in the longer direction.

11. The optical switch array of claim 8, wherein each optical modulation unit comprises a heater.

12. The optical switch array of claim 8, wherein a number of the plurality of optical modulation units is greater than two times a number of the plurality of optical switches.

* * * * *